United States Patent [19]

Rydelek

[11] Patent Number: 5,729,769
[45] Date of Patent: Mar. 17, 1998

[54] WATER-RESISTANT CAMERA

[75] Inventor: James G. Rydelek, Henrietta, N.Y.

[73] Assignee: Eastman Kodak Company, Rochester, N.Y.

[21] Appl. No.: 781,636

[22] Filed: Jan. 10, 1997

[51] Int. Cl.$^6$ .................................................. G03B 17/08
[52] U.S. Cl. ............................................................ 396/29
[58] Field of Search .................................... 396/25, 29

[56] References Cited

U.S. PATENT DOCUMENTS

| | | | |
|---|---|---|---|
| 3,162,106 | 12/1964 | DeWouters et al. | 396/29 |
| 4,265,523 | 5/1981 | Defuans | 396/29 |
| 5,325,139 | 6/1994 | Matsumoto et al. | 396/29 |

Primary Examiner—David M. Gray
Attorney, Agent, or Firm—Roger A. Fields

[57] ABSTRACT

A water-resistant camera comprising a main body part and a rear cover part having a film clearance space between them to permit movement of successive sections of a filmstrip across a backframe opening in the main body part, and a water-resistant casing part spaced over the rear cover part, is characterized in that the water-resistant casing part has continuous stiffener-rib means which surrounds a limited portion of the water-resistant casing part that is opposite the film clearance space, for preventing the limited portion from being bent inwardly against the rear cover part to in turn bend the rear cover part inwardly into the film clearance space when the water-resistant camera is underwater.

7 Claims, 3 Drawing Sheets

WATER-RESISTANT CAMERA

FIELD OF THE INVENTION

The invention relates generally to the field of photography, and in particular to water-resistant cameras such as a one-time-use camera.

BACKGROUND OF THE INVENTION

Film and cameras that are all in one, commonly referred to as single-use or one-time-use cameras, have become well known. Typically, the one-time-use camera is a simple point-and-shoot type comprising a rigid plastic, inner, main body part which supports film cartridge in a cartridge receiving chamber, a film take-up spool in a film supply chamber, a fixed-focus taking lens, a film metering mechanism with a rotatably supported metering sprocket, a manual film advance thumbwheel rotatably engaged with a film spool inside the film cartridge, a single-blade shutter, a manually depressible shutter release button, a frame counter for indicating the number of exposures remaining for picture-taking, a direct see-through viewfinder, and in some models a fixed electronic flash. A pair of substantially thin plastic front and rear cover parts house the main body part between them to complete the camera unit. The rear cover part connects to the main body part and/or to the front cover part to make the main body part light-tight. A decorative cardboard outer box or label at least partially contains the camera unit and may have respective openings for the taking lens, the shutter release button, the film advance thumbwheel, the viewfinder, the frame counter, and a flash emission window for the electronic flash.

To use the one-time-use camera, after the photographer takes a picture, he or she manually rotates the thumbwheel in a film winding direction to rotate the film spool inside the film cartridge, to wind an exposed section of the filmstrip into the film cartridge. The rewinding movement of the filmstrip the equivalent of slightly more than one frame width rotates the metering sprocket (in engagement with the filmstrip) to decrement the frame counter to its next lower-numbered setting and to pivot a metering lever into engagement with the thumbwheel to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip are exposed, and the filmstrip is completely wound off the take-up spool and rewound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer, and he forwards the used camera parts to the manufacturer for recycling, i.e. remanufacture.

Typically, during original manufacture or recycling (remanufacture) of the one-time-use camera, a film leader protruding from the film cartridge is attached to the film take-up spool, the film cartridge and the film take-up spool are loaded into the cartridge receiving and film supply chambers, and an intermediate leader section which bridges the film take-up spool and the film cartridge is engaged with the metering sprocket. Then, the front and rear cover parts are connected to the main body part and/or to the front cover part to complete the camera unit. Then, an engageable end of the take-up spool which protrudes from the film supply chamber is rotated to factory prewind substantially the entire length of the unexposed filmstrip from the film cartridge onto the film take-up spool and to rotate the metering sprocket to increment the frame counter to its total-available frame number setting. Lastly, the outer box is placed on the camera unit.

More recently, underwater one-time-use cameras have been commercialized which generally comprise a substantially thin water-resistant transparent casing and a camera unit contained in the water-resistant casing. A problem that might occur with these simple inexpensive underwater cameras is that at certain underwater depths the water pressure will tend to flex or press the water-resistant casing inwardly toward or against the rear cover part of the camera unit, possibly resulting in some constriction between the rear cover part and the main body part that may inhibit film movement across the backframe opening following each exposure.

SUMMARY OF THE INVENTION

According to one aspect of the invention, a water-resistant camera in which a film clearance space is provided to permit movement of successive sections of a filmstrip across a backframe opening following each exposure, and a water-resistant casing part having a perimeter is spaced opposite the film clearance space, is characterized in that:

the water-resistant casing part has multi-directional stiffener-rib means located within the perimeter, which at least partially borders a limited portion of the water-resistant casing part that is opposite the film clearance space, for preventing the limited portion from being bent inwardly towards the film clearance space when the water-resistant camera is underwater.

More specifically, a water-resistant camera comprising a main body part and a rear cover part having a film clearance space between them to permit movement of successive sections of a filmstrip across a backframe opening in the main body part, and a water-resistant casing part spaced over the rear cover part, is characterized in that:

the water-resistant casing part has continuous stiffener-rib means which surrounds a limited portion of the water-resistant casing part that is opposite the film clearance space, for preventing the limited portion from being bent inwardly against the rear cover part to in turn bend the rear cover part inwardly into the film clearance space when the water-resistant camera is underwater.

According to another aspect of the invention, a water-resistant camera casing part comprising a perimeter, and a particular portion located within the perimeter but spaced from the perimeter, is characterized in that:

the water-resistant casing part has multi-directional stiffener-rib means located between the perimeter and the particular portion, which at least partially borders the particular portion, for preventing the particular portion from being bent because of ambient water pressure.

DETAILED DESCRIPTION OF THE INVENTION

The invention is disclosed as being embodied preferably in a water-resistant one-time-use camera. Because the features of a water-resistant one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
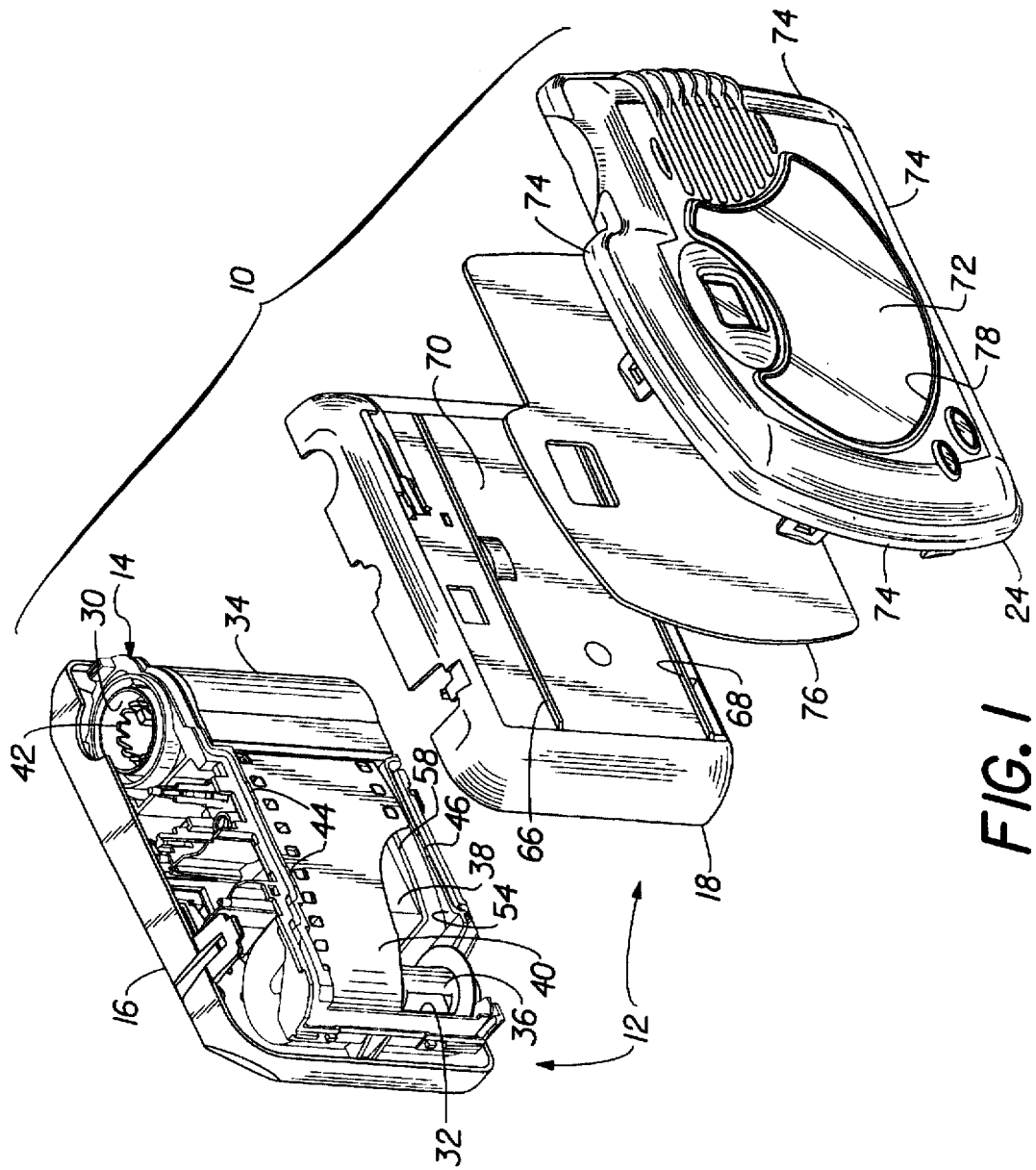
FIG. 1 is a rear exploded perspective view of a water-resistant one-time-use camera, which is a preferred embodiment of the invention.
Figure 2:
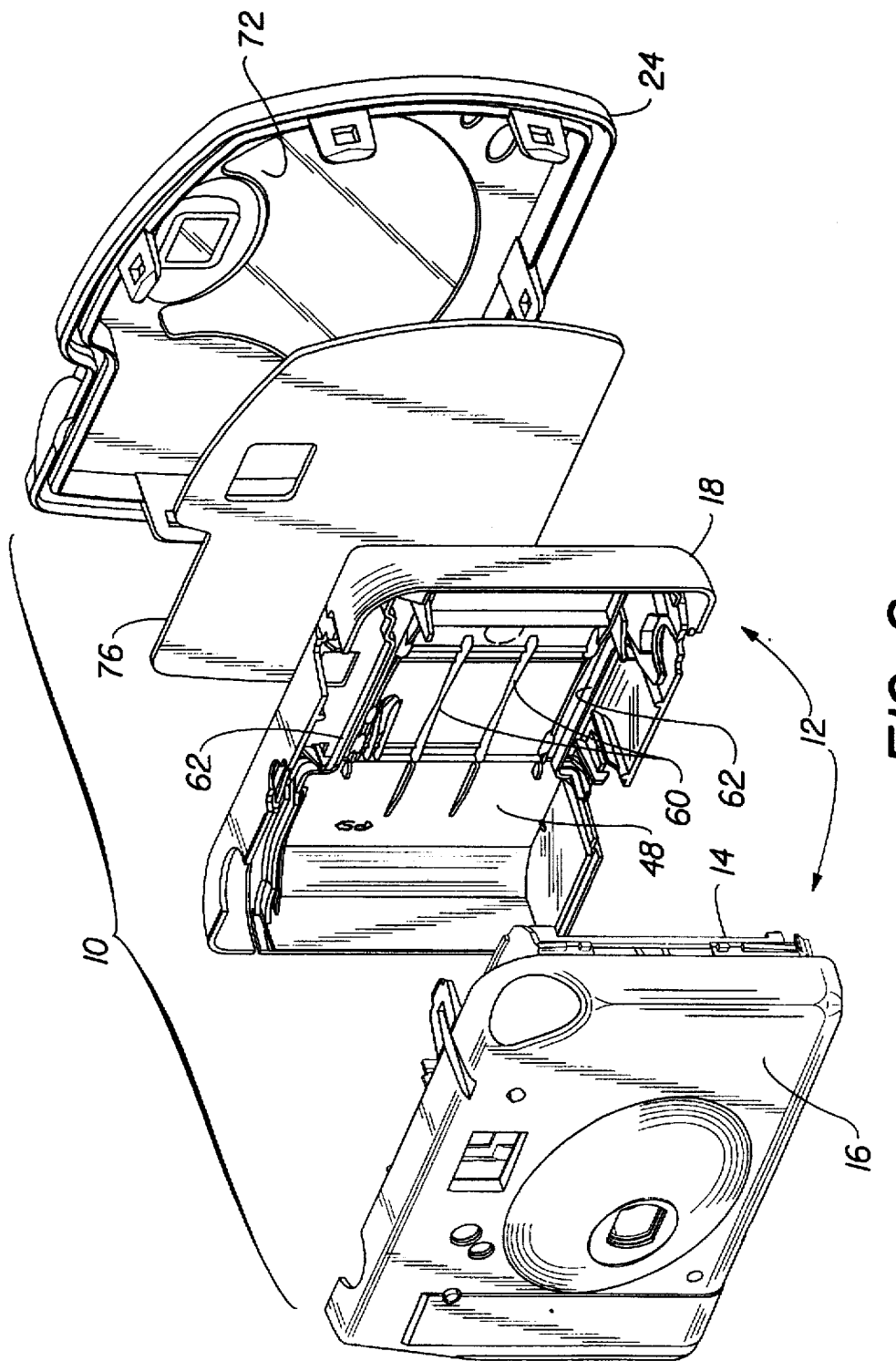
FIG. 2 is a front exploded perspective view of the water-resistant one-time-use camera.
Figure 3:
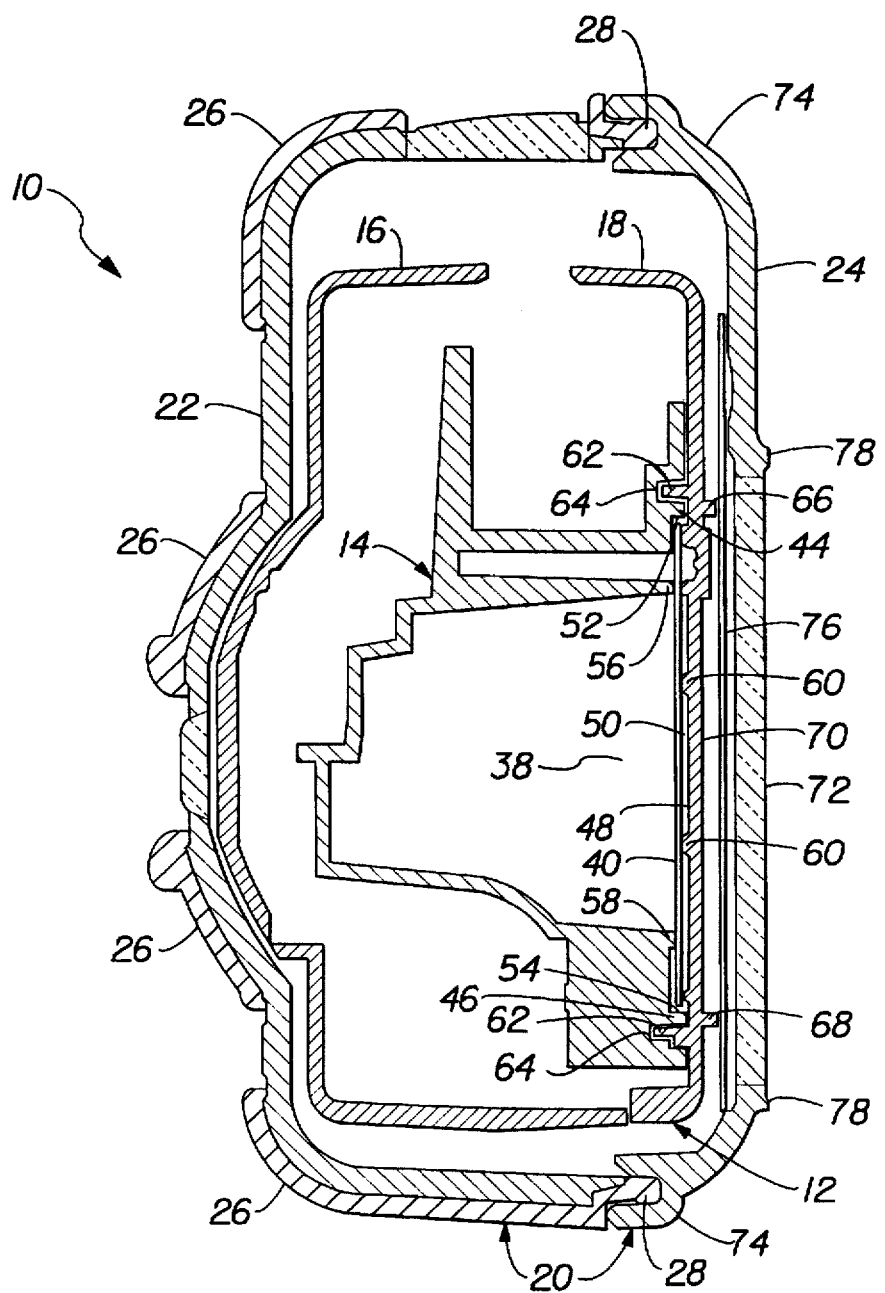
FIG. 3 is a side elevation section view of the water-resistant one-time-use camera.

Referring now to the drawings, FIGS. 1–3 show a water-resistant one-time-use camera 10 comprising an opaque-plastic interior camera unit 12 having a rigid main body part 14 and a pair of substantially thin front and rear cover parts 16 and 18 which connect to one another to form a camera housing which houses the main body part in order to complete the camera unit, and an exterior water-resistant casing 20 having a pair of substantially thin transparent-plastic front and rear casing parts 22 and 24 which connect to one another to contain the camera unit and a rubber overlay 26 on the front casing part which includes an endless sealing bead 28 that fits between the front and rear casing parts as shown in FIG. 3.

The main body part 14 is adapted to be nested in the front cover part 16, and the rear cover part 18 is intended to be fitted to the main body part to make the main body part light-tight. As shown in FIGS. 1 and 3 the main body part 14 has integral cartridge-receiving and film roll chambers 30 and 32 for a light-tight film cartridge 34 and a film supply spool 36. The chambers 30 and 32 are located at opposite sides of a rear backframe or film exposure opening 38 at which successive sections of a filmstrip 40 are exposed during picture-taking. The successive film sections are moved from an unexposed film roll (not shown) on the spool 36, to the backframe opening 38 and, thence, into the cartridge 34 by manually rotating an exterior thumbwheel (not shown) in winding engagement with a spool 42 inside the cartridge. See FIG. 1.

As shown in FIG. 1 and 3, the main body part 14 has an integral pair of relatively short, rigid, upper spacer projections or pads 44 and a single, similar, lower spacer projection or pad 46, separate from but close to the backframe opening 38, which are slightly spaced from an inner side 48 of the rear cover part 18 to be able to abut the inner cover part side in order to maintain a film clearance space 50 between the backframe opening and the inner cover side for movement of successive sections of the filmstrip 40 across the backframe opening. The pair of upper spacer projections 44 and the single lower spacer projection 46 have respective right-angled sides that coincide with parallel, longitudinal film edge guides 52 and 54 on the main body part 14. The two film edge guides 52 and 54 and the three spacer projections 44 and 46 border the film clearance space 50.

As shown in FIG. 1 and 3, the main body part 14 has a pair of curved film rails 56 and 58 between the backframe opening 38 and the three spacer projections 44 and 46 to support successive sections of the filmstrip 40 in a curved film plane at the film clearance space 50. The inner side 48 of the rear cover part 18 has a pair of parallel, curved film guide ribs 60 facing the backframe opening 38 to hold successive sections of the filmstrip 40 in the curved film plane at the film clearance space 50. The main body part 14 and the inner cover part side 48 have interlocking light-trapping ribs 62 and grooves 64 separate from the film clearance space 50.

The rear cover part 18 has a pair of parallel upper and lower support projections or ribs 66 and 68 on an outer side 70 of the rear cover part which face the rear water-resistant casing part 24 as shown in FIG. 1. The respective upper and lower support ribs 66 and 68 are aligned with the pair of upper spacer projections 44 and the single lower spacer projection 46 as shown in FIG. 3. If the water-resistant camera 10 is underwater, a relatively strong ambient water might tend to press or flex the rear water-resistant casing part 24 inwardly toward the rear cover part 18 to in turn depress the rear cover part into the film clearance space 50 to interfere with film movement. However, the upper and lower support ribs 66 and 68 will cooperate with the upper and lower spacer projections 44 and 46 to prevent the rear water-resistant casing part 24 from pushing the rear cover part 18 into the film clearance space 50 to interfere with film movement.

As shown in FIGS. 1–3, the rear water-resistant casing part 24 can be non-transparent except for a substantially flat central portion 72 which is transparent. The central portion 72 is spaced from the perimeter 74 of the rear water-resistant casing part 24. A camera-identifying instruction label 76 is positioned directly between the central portion 72 and the rear cover part 18 to permit the label to be viewed through the central portion. The central portion 72 is parallel to the label 76 as can be seen in FIG. 3, to provide a clear undistorted view of the label.

A continuous integral stiffener-rib 78 of the rear water-resistant casing part 24 intimately surrounds the central portion 72. See FIGS. 1–3. The stiffener-rib 78 prevents the central portion 72 from being bent out of its flat plane, inwardly against the label 76 and in turn the rear cover part 18, when the water-resistant camera 10 is underwater. Thus, the rear cover part 18 will not be pushed inwardly toward the film clearance space 50 because of the ambient water pressure. Since the stiffener-rib 78 is continuous, i.e. in a closed loop, it provides a multi-directional stiffness for the central portion 72. That is, a stiffness exerted at least along an x-axis and a y-axis. This is better than simply providing a unidirectional stiffness, i.e. one along only an x-axis or a y-axis.

Since the central portion 72 is prevented from being bent out of its flat plane because of the ambient water pressure, the central portion is maintained parallel to the label 76. This is important. If the central portion 72 were bent into a curve because of the ambient water pressure, the view of the label 76 through the central portion might become distorted.

The invention has been described with reference to a preferred embodiment. However, it will be appreciated that variations and modifications can be effected by a person of ordinary skill in the art without departing from the scope of the invention.

PARTS LIST

- 10. water-resistant camera
- 12. camera unit
- 14. main body part
- 16. front cover part
- 18. rear cover part
- 20. water-resistant casing
- 22. front casing part
- 24. rear casing part
- 26. rubber overlay
- 28. endless sealing band
- 30. cartridge-receiving chamber
- 32. film roll chamber 34. film cartridge
36. film supply spool
38. backframe opening
40. filmstrip
42. cartridge spool
44. pair of upper spacer projections
46. lower spacer projection
48. inner cover side
50. film clearance space
52. longitudinal film edge guide
54. longitudinal film edge guide
56. curved film rail
58. curved film rail
60. pair of curved film guide ribs
62. light-trapping ribs
64. light-trapping grooves
66. support rib
68. support rib
70. outer side of 18
72. flat central portion of 24
74. perimeter of 24
76. label
78. stiffener-rib

I claim:

1. A water-resistant camera in which a film clearance space is provided to permit movement of successive sections of a filmstrip across a backframe opening following each exposure, and a water-resistant casing part having a perimeter is spaced opposite said film clearance space, is characterized in that:

said water-resistant casing part is non-transparent except for a limited transparent viewing portion that is opposite said film clearance space;

a label is positioned between said film clearance space and said limited transparent viewing portion to permit said label to be viewed; and said water-resistant casing part has a multi-directional stiffener-rib located within said perimeter, which at least partially borders said limited transparent viewing portion of the water-resistant casing part, to prevent said limited transparent viewing portion from being bent inwardly towards said label when said water-resistant camera is underwater.

2. A water-resistant camera in which a film clearance space is provided to permit movement of successive sections of a filmstrip across a backframe opening following each exposure, and a water-resistant casing part is spaced opposite said film clearance space, is characterized in that:

said water-resistant casing part has a continuous endless stiffener-rib which surrounds a limited portion of the water-resistant casing part that is opposite said film clearance space, to prevent said limited portion from being bent inwardly towards the film clearance space when said water-resistant camera is underwater.

3. A water-resistant camera comprising a main body part and a rear cover part having a film clearance space between them to permit movement of successive sections of a filmstrip across a backframe opening in said main body part, and a water-resistant casing part spaced over said rear cover part, is characterized in that:

said water-resistant casing part has a continuous endless stiffener-rib which surrounds a limited portion of the water-resistant casing part that is opposite said film clearance space, to prevent said limited portion from being bent inwardly against said rear cover part to in turn bend the rear cover part inwardly into the film clearance space when said water-resistant camera is underwater.

4. A water-resistant camera as recited in claim 3, wherein a label is positioned directly between said rear cover part and said limited portion, and said water-resistant casing part is non-transparent except for said limited portion which is transparent to permit said label to be seen.

5. A water-resistant camera as recited in claim 4, wherein said limited portion and said label are substantially flat and arranged parallel to one another, and said continuous stiffener-rib is adapted to prevent said limited portion from being bent out of a flat plane because of ambient water pressure in order to maintain the limited portion parallel to said label.

6. A water-resistant camera casing part comprising a perimeter, and a limited portion located within said perimeter but spaced from the perimeter, is characterized in that:

a continuous endless stiffener-rib surrounds said limited portion to prevent the limited portion from being bent out of a flat plane because of ambient water pressure.

7. A water-resistant camera casing part as recited in claim 6, wherein said casing part is non-transparent except for said limited portion which is transparent to permit viewing through the limited portion.

* * * * *